United States Patent
Shanmugam et al.

(10) Patent No.: US 10,591,875 B2
(45) Date of Patent: Mar. 17, 2020

(54) PROCESS OPTIMIZATION METHOD AND SYSTEM FOR A POWER PLANT

(75) Inventors: Mohan Kumar Shanmugam, Chennai (IN); Senthil Kumar Sundaram, Bangalore (IN); Gopinath Selvaraj, Madurai (IN); Shrikant Bhat, Nagpur (IN)

(73) Assignee: ABB Schweiz AG, Baden (CH)

( * ) Notice: Subject to any disclaimer, the term of this patent is extended or adjusted under 35 U.S.C. 154(b) by 553 days.

(21) Appl. No.: 13/540,075

(22) Filed: Jul. 2, 2012

(65) Prior Publication Data

US 2013/0006429 A1 Jan. 3, 2013

Related U.S. Application Data

(63) Continuation of application No. PCT/IB2010/001103, filed on May 13, 2010.

(30) Foreign Application Priority Data

Dec. 31, 2009 (IN) .......................... 3246/CHE/2009

(51) Int. Cl.
*G05B 13/04* (2006.01)
*G05B 19/418* (2006.01)
*F02C 9/42* (2006.01)

(52) U.S. Cl.
CPC .............. *G05B 13/041* (2013.01); *F02C 9/42* (2013.01); *G05B 19/418* (2013.01); *F05D 2270/44* (2013.01); *F05D 2270/71* (2013.01)

(58) Field of Classification Search
CPC ......... G06F 1/26; G05B 11/32; G05B 13/041; G05B 13/042; G05B 13/048; F02C 9/42; F02D 2270/44; F02D 2270/71

USPC ......... 700/29, 36, 49; 60/646, 660; 702/182; 705/7.12; 706/14

See application file for complete search history.

(56) References Cited

U.S. PATENT DOCUMENTS

| | | | | |
|---|---|---|---|---|
| 5,477,444 A | * | 12/1995 | Bhat et al. | ...................... 700/48 |
| 5,640,491 A | | 6/1997 | Bhat et al. | |
| 5,873,251 A | * | 2/1999 | Iino | ................................ 60/660 |
| 6,321,207 B1 | * | 11/2001 | Ye | ................................ 705/7.25 |

(Continued)

FOREIGN PATENT DOCUMENTS

EP 1 420 153 A2 5/2004

OTHER PUBLICATIONS

International Search Report (PCT/ISA/210) dated Nov. 5, 2010, by the European Patent Office as the International Searching Authority for International Application No. PCT/IB2010/001103.

*Primary Examiner* — Jennifer L Norton

(74) *Attorney, Agent, or Firm* — Barnes & Thornburg LLP

(57) ABSTRACT

A method and system are disclosed for optimizing load scheduling for a power plant having one or more power generator units. An exemplary method and corresponding system can involve detecting an event indicative of a need for adapting one or more constraints for an objective function used in load scheduling. On such detection, the objective function is analysed to determine adaptive constraint values for the one or more constraints for optimally solving the objective function. These adaptive constraint values can be used to solve the objective function and the solution of the objective function with the one or more adapted constraint values can be used to operate the one or more power generation units of the power plant.

6 Claims, 3 Drawing Sheets

(56) References Cited

U.S. PATENT DOCUMENTS

| | | | |
|---|---|---|---|
| 6,681,155 B1 * | 1/2004 | Fujita et al. | 700/287 |
| 7,389,209 B2 * | 6/2008 | Masiello et al. | 703/2 |
| 10,013,600 B2 * | 7/2018 | Chen | G06K 9/00288 |
| 2004/0006502 A1 * | 1/2004 | Masiello et al. | 705/8 |
| 2004/0039622 A1 * | 2/2004 | Masiello et al. | 705/8 |
| 2004/0049295 A1 | 3/2004 | Wojsznis et al. | |
| 2004/0049299 A1 | 3/2004 | Thiele et al. | |
| 2004/0049300 A1 * | 3/2004 | Thiele et al. | 700/29 |
| 2004/0088060 A1 | 5/2004 | Renou et al. | |
| 2004/0123600 A1 * | 7/2004 | Brunell et al. | 60/773 |
| 2004/0249775 A1 * | 12/2004 | Chen | 706/21 |
| 2004/0260430 A1 * | 12/2004 | Mansingh et al. | 700/286 |
| 2005/0246039 A1 * | 11/2005 | Iino et al. | 700/29 |
| 2006/0058899 A1 * | 3/2006 | Boyden et al. | 700/44 |
| 2006/0178782 A1 | 8/2006 | Pechtl et al. | |
| 2007/0106399 A1 * | 5/2007 | Korchinski | G05B 13/042 700/30 |
| 2008/0021675 A1 * | 1/2008 | Fehr | G06Q 10/04 702/182 |
| 2014/0316973 A1 * | 10/2014 | Steven | G06Q 50/06 705/37 |
| 2017/0343969 A1 * | 11/2017 | Dykstra | E21B 44/00 |
| 2018/0373208 A1 * | 12/2018 | Wee | G05B 13/042 |
| 2019/0339677 A1 * | 11/2019 | Yoshida | G05B 19/4183 |

\* cited by examiner

PROCESS OPTIMIZATION METHOD AND SYSTEM FOR A POWER PLANT

RELATED APPLICATION

This application claims priority as a continuation application under 35 U.S.C. § 120 to PCT/IP2010/001103, which was filed as an International Application on May 13, 2010, designating the U.S., and which claims priority to Indian Application 3246/CHE/2009 filed in India on Dec. 31, 2009. The entire contents of these applications are hereby incorporated by reference in their entireties.

FIELD

A system and method are disclosed for process optimization for power plants, as such as load scheduling optimization in the power plant by using adaptive constraints in the optimization method and system.

BACKGROUND

Known power plants can include several units, each having a set of equipment contributing to different stages of power generation. Such equipment can include for example, boilers, steam turbines and electrical generators. For the optimal running of the power plant, an important aspect can be optimal load scheduling between the different units and the respective equipment in order to meet a given power demand.

Load scheduling can have a major impact on productivity of the power generation process. A purpose of load scheduling is to minimize the power production time and/or costs, by deciding the timing, values etc. of different operating parameters for each piece of equipment in order to meet the power demand effectively and efficiently. The load scheduling can be optimized by an optimizer in the power plant control system.

A goal for the optimization exercise, for example, can be to express cost minimization as an objective function for the optimization problem. The optimization method can solve such an objective function within identified constraints. Almost all of the operational parameters can be expressed as a cost function and the optimizer can be deployed to solve the cost function associated with a variety of operations and their consequences (e.g. penalty for not meeting the demand). The solution from the optimizer can provide setpoints for the various operations to achieve desired optimized results.

The optimizer can use techniques suct as Non Linear Programming (NLP), Mixed Integer Linear Programming (MILP), Mixed Integer Non Linear Programming (MINLP), etc to solve the objective function.

In the formulation of an objective function, it can be desirable to include as many terms as possible (fuel cost, emission reduction cost, start-up and shutdown cost, ageing cost, maintenance cost, penalty cost) for consideration in the objective function in an effort to optimize the work of everything possible. When several such terms are considered in the objective function formulation, the solving of the objective function can become difficult as there is reduction in the degree of freedom to make adjustments in operating parameters (e.g., setpoints for different equipment), in order to achieve an optimal solution for the power plant. The number of terms to be considered for a particular objective function can be based on how the process control system has been designed and the values of constraints. If the number of terms is greater (e.g., it considers almost all possible aspects of the power plant in one go or has very tight constraints) then there is a possibility that the objective function may not have a solution. It may be noted that the issue of no solution as described herein may also occur when there are conditions that are not considered in the power plant model or not controllable in the power plant from the results of the optimizer.

Currently, in situations where the objective function is not solved within a reasonable time given a set of constraints, the power plant can be operated in a sub-optimal way. In addition to no-solution situations, there are other situations where one is unsure if the optimized solution is the best solution (e.g., the solution identified is the best among the multiple solutions available or is the most suitable to operate the plant in stable manner even if the solution appears to be slightly sub-optimal). More often, one does not know if there were different constraint values, and whether a better solution could have been possible.

The present disclosure describes a method which can identify and treat such situations so that the optimizer provides an acceptable solution in a defined manner. More specifically the present disclosure describes a system and method which can solve an objective function for a power plant operation by identifying and relaxing some constraints.

SUMMARY

According to one aspect of the disclosure a method for optimizing load scheduling for a power plant having one or more power generation units is provided.

An exemplary method comprises detecting an event indicative of a need for adapting one or more constraints for an objective function used in load scheduling; analyzing the objective function to determine adaptive constraint values for the one or more constraints for optimally solving the objective function; using the adaptive constraint values of one or more constraints to solve the objective function; and using the solution of the objective function with the one or more adapted constraint values to operate the one or more generators of the power plant.

According to another aspect, an optimizer for optimizing load scheduling for a power plant having one or more power generation units can include a constraint analysis module comprising an adaptive constraint evaluation module for detecting an event indicative of a need for adapting one or more constraints for an objective function used in load scheduling, for analyzing the objective function to determine adaptive constraint values for the one or more constraints for optimally solving the objective function, and for using the adaptive constraint values of one or more constraints to produce a solution to the objective function; and an output for an optimizer to receive the solution of the objective function with the one or more adaptive constraint values such that a setpoint can be generated to operate one or more power generation units.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

As used herein and in the claims, the singular forms "a," "an," and "the" include the plural reference unless the context clearly indicates otherwise.

Exemplary systems and methods described herein can optimize power plant operation to meet the desired power demand under conditions of non-convergence of a solution with existing constraints, or under conditions when it is not clear that the solution with existing constraints is a best solution. Exemplary systems and methods described herein can ensure that the power plant is operated by properly defining the constraints, their values and by ensuring there is an optimal solution every time (e.g., the degree of freedom is available for solving the objective function and hence the optimization solution is dynamically improved while still considering all the terms defined in the objective function).

To achieve an optimized solution, the novel modules and methods disclosed herein can advantageously provide for adapting the value of constraints dynamically to solve an objective function and induce beneficial solutions. Such adaptations can be performed within the permissible beneficial outcomes (short-term and long-term) of the power plant.

These aspects will now be further explained herewith in reference to the drawings.

Figure 1:
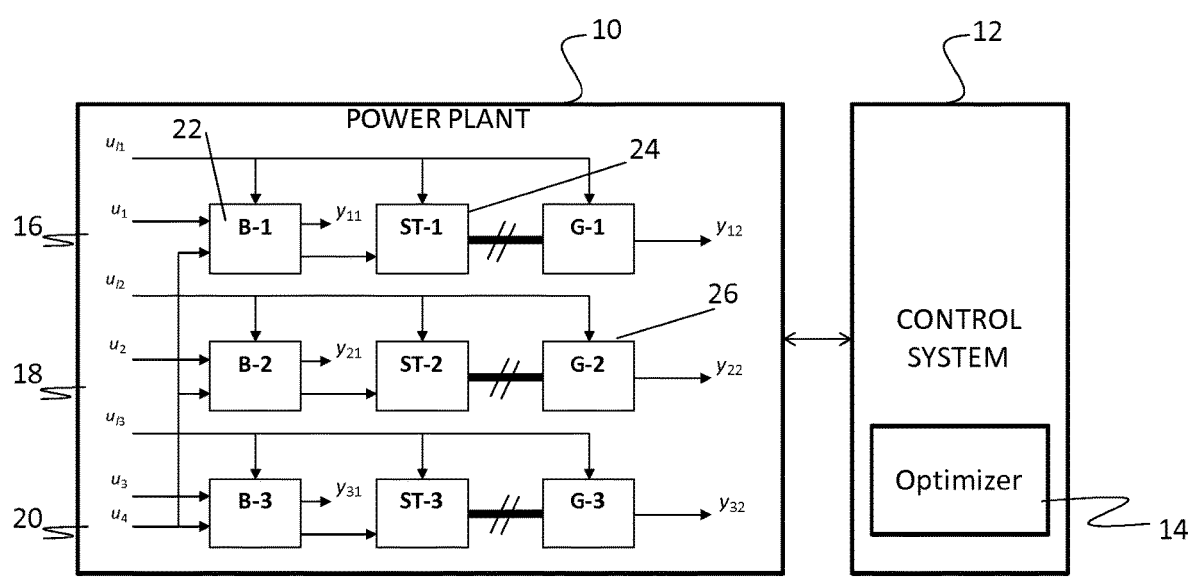
FIG. 1 is a block diagram representation of a simplified generic fossil fired power plant (FFPP) according to an exemplary embodiment disclosed herein.

FIG. 1 is a block diagram representation of an exemplary simplified generic fossil fired power plant (FFPP) 10 that is controlled by a control system 12 that includes an optimizer 14 to obtain the optimal solution for operating the power plant. The FFPP 10 includes three FFPP units, 16, 18, 20 running in parallel. Each FFPP unit has three main pieces of equipment namely, a boiler (B) 22, a steam turbine (ST) 24, and an electrical generator (G) 26, the steam turbine being mechanically coupled with the electrical generator (G) 26. Under operation, steam loads, generically referred to as $u_1$, $u_2$ and $u_3$, are representative of the steam generated by the respective boiler and the corresponding fuel consumption is expressed as $y_{11}$, $y_{21}$, $y_3$. The manipulated variables $u_{I1}$, $u_{I2}$ and $u_{I3}$ are binary variables which define the state of the boiler whether it is "off" or "on". The steam from the boiler is suppled to the steam turbine to work the generators. The power output from the generators is expressed as $y_{12}$, $y_{22}$, $y_{32}$.

The control system 12 can be used to monitor and control the different operating parameters of the power plant 10 to ensure the power plant is operated at the optimum conditions. For optimal running of the power plant, as explained earlier, one of the exemplary important aspects is optimal load scheduling between the different FFPP units as shown in FIG. 1, and the calculation for the optimized solution is done at the optimizer 14.

In an exemplary embodiment, an objective of load scheduling optimization is to meet the power demand by scheduling the load among the three FFPP units, subject to different constraints such as the minimization of the fuel cost, start up cost, running cost, emission cost and life time cost. The optimizer 14 receives inputs from the power plant, and applies optimization techniques for the optimal load scheduling. Based on the optimal solution, the control system 12 sends commands to different actuators in the power plant to control the process parameters.

According to exemplary aspects of the present disclosure, the optimizer 14 can include novel modules to handle the exemplary situations of non-convergence of a solution with existing constraints, or under conditions when it is not clear that the solution with existing constraints is the best solution. These novel modules and the associated methods are explained in more detail in reference to FIG. 2

Figure 2:
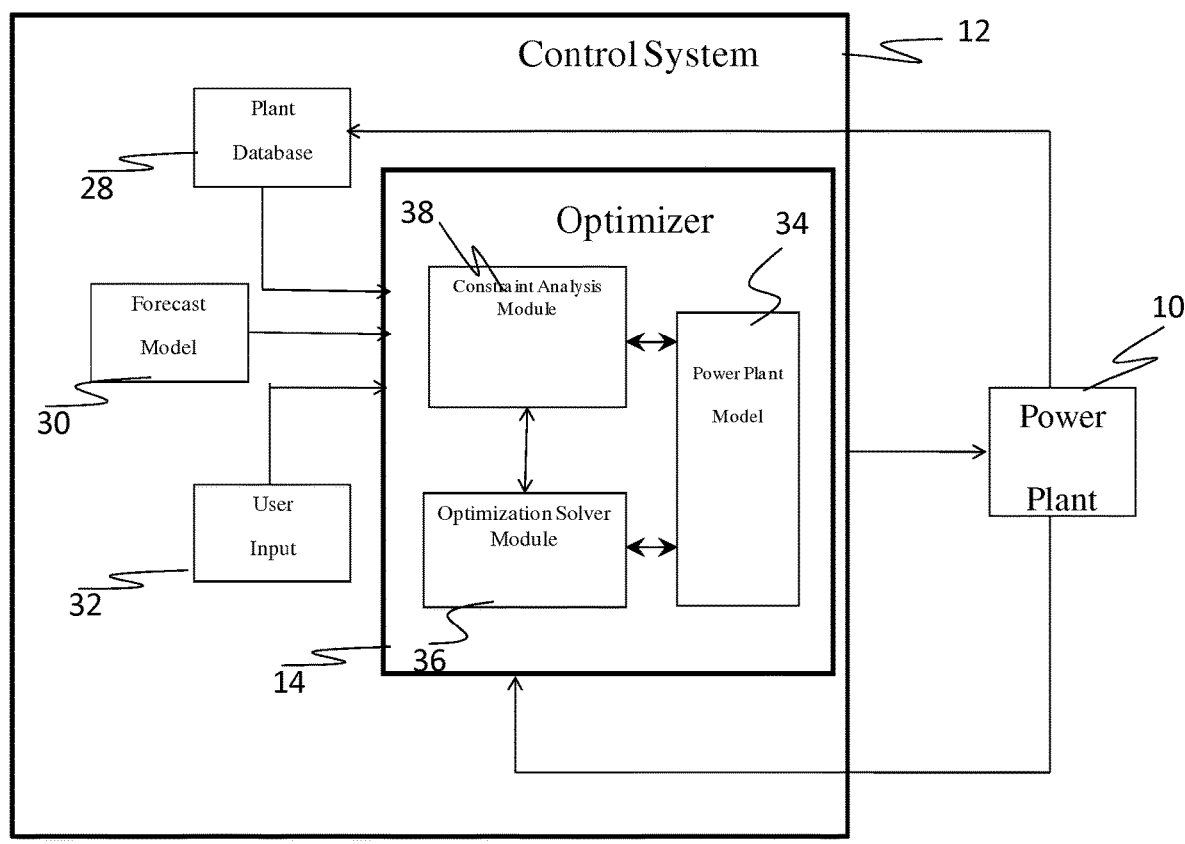
FIG. 2 is a block diagram representation of an exemplary control system for the power plant of FIG. 1.

FIG. 2 is a block diagram representation of the optimizer 14 within the control system 12 as explained in reference to FIG. 1. The modules within the optimizer 14 use the inputs from a power plant database 28 that provides historic power plant operating data, a power demand forecast model 30 that provides future power demand forecasts, a user input 32 for any specific user needs; and a power plant model 34 for providing simulated data for the power plant and the power plant 10 for providing current operating data.

The optimizer 14 can include an optimization solver module 36 to solve the objective function, for example as per the equations 1-16 given below.

In an exemplary optimization method for the FFPP power plant described herein, the objective function being considered can be a cost function that is to be minimized as given by, for example, equation. 1. The optimization problem can be solved within the constraints as defined by, for example, equations 10 to 16, to obtain an optimal load schedule for the power plant.

The optimization of a power plant can be performed by minimizing the following cost function by choosing the optimal values for u's:

$$\min J$$

$$u_1, u_2, u_3, u_{I1}, u_{I2}, u_{I3}$$

Where, $$J = C_{dem} + C_{fuel} + C_{emission} + C_{st\ startup} + C_{st\ fixed} + C_{st\ life} + C_{boiler\ startup} + C_{boiler\ fixed} + C_{boiler\ life} - E \quad (1)$$

Each of the terms in the cost function (J) is explained below. $C_{dem}$ is the penalty function for not meeting the electric demands over a prediction horizon:

$$C_{dem} = \sum_{t=T}^{T+M-dt} k_{dem\ el} \left| \sum_{i=1}^{n} y_{i2}(t) - D_{dem\ el}(t) \right| \quad (2)$$

where $k_{dem\ el}(t)$ is a suitable weight coefficient and $D_{dem\ el}(t)$, for t=T, . . . , T+M−dt is a forecast of electric demand within the prediction horizon, and $y_{12}$, $y_{22}$, $y_{32}$ are the powers generated by the respective generators. Here M is a length of the prediction horizon, T is a current time and dt is a time interval.

$C_{fuel}$ is a cost for fuel consumption represented in the model for FFPP by the outputs $y_{11}$, $y_{21}$, $y_{31}$ and thus the total cost for fuel consumption is given by:

$$C_{fuel} = \sum_{t=T}^{T+M-dt} \sum_{i=1}^{n} k_{i\ fuel} y_{i1}(t) \quad (3)$$

where $k_{i\ fuel}$ is a cost of fuel consumption $y_{i1}$.

$C_{emission}$ is a cost involved in reducing pollutant emission ($NO_x$, $SO_x$, $CO_x$) produced by the power plant and is given by:

$$C_{emission} = \sum_{t=T}^{T+M-dt} \sum_{i=1}^{n} k_{i\,emisson} f(y_{i2}(t)) \quad (4)$$

where $k_{i\,emission}$ is a cost coefficient for producing the power $y_{i2}$.

$C_{st\,startup}$ is a cost for start up of the steam turbine given by:

$$C_{st\,startup} = \sum_{t=T}^{T+M-2dt} k_{st\,startup} \max\{u_{i1}(t+dt) - u_{i1}(t), 0\} \quad (5)$$

where $k_{st\,startup}$ represents a positive weight coefficient.
$C_{st\,fixed}$ represents a fixed running cost of the steam turbine. It is, for example, non-zero only when the device is on and it does not depend on the level of a steam flow $u_2$, and is given by:

$$C_{st\,fixed} = \sum_{t=T}^{T+M-dt} k_{st\,fixed} u_{i1}(t) \quad (6)$$

where $k_{st\,fixed}$ represents any fixed cost (per hour) due to use of the turbine.

$C_{st\,life}$ describes an asset depreciation due to loading effect and is defined as:

$$C_{st\,life} = \sum_{comp=1}^{NumComponents} LT_{comp,load}(t) \quad (7)$$

and therefore:

$$LT_{comp,load} = \left(\frac{Load}{Load_{base}}\right) * (M - dt) * cost_{EOH} \quad (8)$$

Here, $LT_{compload}$ is a life time cost of a component which could be, for example, a boiler, turbine or generator for the given load, and the term:

$$\left(\frac{Load}{Load_{base}}\right)$$

on RHS of equation 8 calculates a rate of EOH (Equivalent Operating Hours) consumption with respect to the base load ($Load_{base}$). This term can be multiplied by the total time during which the unit is running at that load. The optimizer calculates the EOH consumption for each sampling time and eventually adds the EOH consumption at every sampling instance into the cost function.

The terms, $C_{boiler\,startup}$, $C_{boiler\,fixed}$, $C_{boiler\,life}$ etc. are similar to equivalent terms in the steam turbine and their description requires no further discussion for those skilled in the art to understand these terms.

E is a term for revenues obtained by sales of electricity and credits from emission trading. This term can take into account that only a minimum between of what is produced and what is demanded can be sold:

$$E = \sum_{t=T}^{T+M-dt} \sum_{i=1}^{n} p_{i,el}(t) y_{i2}(t). \quad (9)$$

where $p_{i,el}(t)$ is a cost coefficient for electrical energy generated.

The above stated optimization problem can be subjected to one or more of the following constraints:

a) Minimum & Maximum load constraints for a boiler and turbine coupled with a generator, etc.:

$$u_{i,min} \leq u_i \leq u_{i,max}$$

$$y_{i,min} \leq y_{i,2} \leq y_{i,max} \quad (10)$$

b) Ramp up and ramp down constraints $$\frac{d(u_i)}{dt} \leq ramp_{max} \quad (11)$$

$$\frac{d(u_i)}{dt} \geq ramp_{min} \quad (12)$$

c) Minimum up time and down time constraints

These constraints can ensure a certain minimum uptime and downtime for the unit. Minimum downtime means that if a unit is switched off, it should remain in a same state for at least a certain period of time. The same logic applies to minimum uptime. This is a physical constraint to ensure that the optimizer does not switch on or off the unit too frequently:

if $t_{off} \leq downtime_{min}$ then $u_{l,i}=0$ (13)

if $t_{on} \leq uptime_{min}$ then $u_{l,i}=1$ (14)

where $t_{off}$ is a counter which starts counting when the unit is switched off and when $t_{off}$ is less than the minimum downtime, a state of the unit $u_l$ should be in an off state.

d) spare unit capacity constraints:

$$y_{spare,min} \leq y_{spare} \leq y_{spare,max} \quad (15)$$

e) tie line capacity constraints, etc.:

$$y_{tie,min} \leq y_{tie\,line} \leq y_{tie,max} \quad (16)$$

While obtaining an optimal output, there can be a desire to consider all the different aspects or terms in the formulation of the objective function such as $C_{emission}$, $C_{fuel}$, $C_{life}$, etc along with the related constraints. It will be appreciated by those skilled in the art that each of these terms is a function of manipulated variables $u_{l1}$, $u_{l2}$ and $u_{l3}$, and that the constraints are related to these manipulated variables.

As explained earlier, when several such terms are considered in the objective function formulation, the solving of the objective function can become difficult as there is reduction in the degree of freedom to make adjustments in operating parameters (e.g., set points for different equipments) in order to achieve the optimal solution for the power plant. Also, there are situations where the solution obtained may not be the best solution, as explained earlier. The actions after encountering these situations are explained in more detail herein below.

The constraint analysis module 38 is activated when there is a condition of non-convergence of the objective function or it is not clear if the solution obtained by the optimization solver module 36 is the best solution. Both of these situations create an "event" that is indicative of a need for adapting one or more constraints. On detection of such event, the constraint analysis module 38 is activated to calculate new constraint values to solve the objective function.

Figure 3:
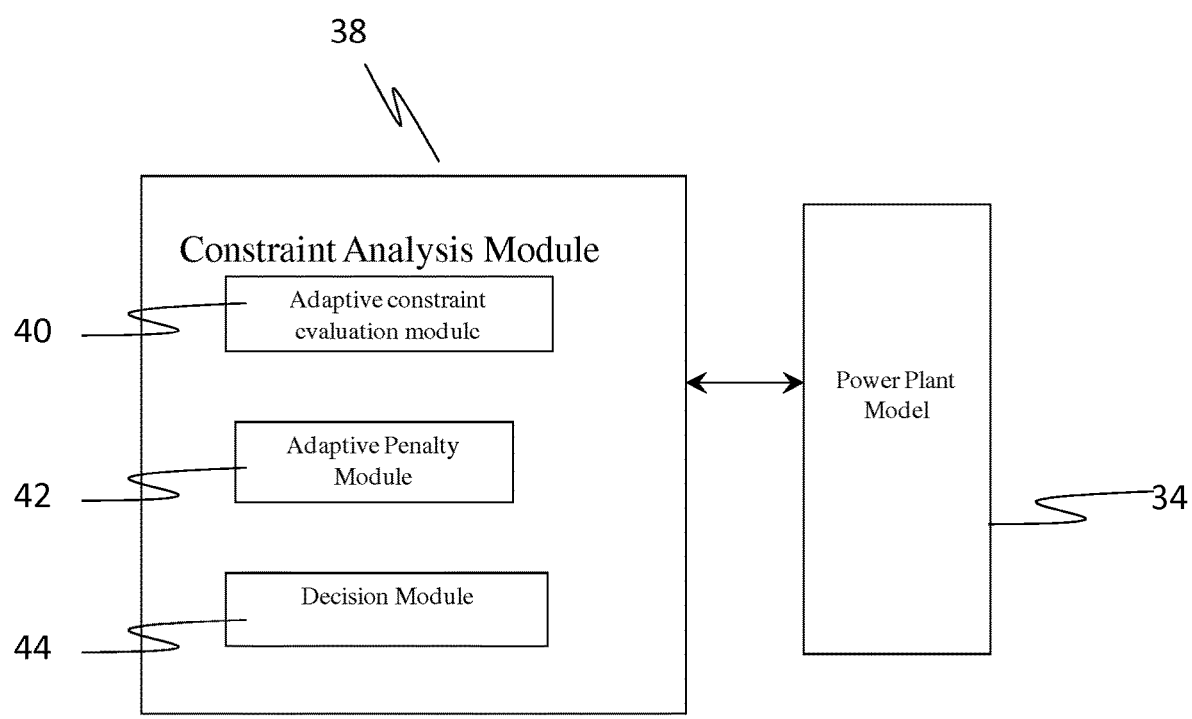
FIG. 3 is a block diagram representation of an exemplary constraint analysis module in an optimizer of the control system of FIG. 2.

The constraint analysis module 38 determines the new constraint values as explained in reference to FIG. 3.

Referring now to FIG. 3, an exemplary constraint analysis module 38 includes an adaptive constraint evaluation module 40 to select one or more adaptive constraints (e.g., constraints whose values can be altered), and the values for these adaptive constraints to solve the objective function. In an exemplary embodiment, the adaptive constraint evaluation module 40 analyzes using the power plant model 34 and the objective function, which of the manipulated variable(s) may be relaxed through its constraints for optimization, referred to herein as "flexible manipulated variables" and by how much in terms of values, and also which of the manipulated variables cannot be relaxed, referred herein as "tight manipulated variables". Accordingly, the adaptive constraint evaluation module 40 selects the constraints to be relaxed which are referred herein as "adaptive constraints" and the new values of such constraints referred to herein as "adaptive constraint values" in order to arrive at an optimal solution.

In an exemplary embodiment, the adaptive constraints and the adaptive constraint values may also be pre-configured. For example, the adaptive constraint evaluation module 40 has pre-configured definitions for desirable constraint values and also acceptable adaptive constraint values allowing for deviation from the desirable constraint values (e.g., how much the constraint value can vary may be predefined). The acceptable adaptive constraint values may be the same as or within the limits specified by the manufacturer or system designer to operate the plant.

Further, it is possible to have priorities that are pre-assigned to different flexible manipulated variables based on their impact and importance with respect to the solution of the objective function (minimization problem). Priorities may also be determined to select the adaptive constraints and adaptive constraint values through techniques like sensitivity analysis or principal component analysis. In one example, the most sensitive constraint with respect to the solution of the objective function is assigned the highest priority so that its value is selected first as the adaptive constraint value to solve the objective function.

Similarly there may be priorities pre-assigned to the adaptive constraint values (e.g., within the acceptable values for adaptive constraints there may be two or more sets of values that are possible and these may be prioritized for selection and use). In this embodiment, the adaptive constraint evaluation module 40 selects the preconfigured acceptable adaptive constraint values based on priorities already defined, if available.

In the situation where no solution still results after applying a prioritized adaptive constraint, the solution may be attempted by relaxing more than one adaptive constraints at same time, based on the priorites.

In another embodiment, the adaptive constraint evaluation module 40 may deploy techniques such as principal component analysis to determine which cost function is most significant and then identify which manipulated variable is a significant term or dominated term, as a "flexible manipulated variable" or "tight manipulated variable" and use the acceptable constraint values to simulate (e.g., through Monte-Carlo method) and to identify what may be the value for the flexible manipulated variable that may be suitable as an adaptive constraint value, the value being as close as possible to the existing (or desired) constraint value, that results in a solution. In this case, through simulation or by use of other statistical techniques (such as methods used in design of experiments), it is determined which ones and how many constraints to be relaxed. For example, it is determined how many adaptive constraints can be considered and by what extent (e.g., what would be the values of such adaptive constraints). As one skilled in the art would appreciate, the determination of adaptive constraints and their value is another optimization problem to optimally determine which adaptive constraints to be relaxed, and by how much, to produce effects as close to the desired or recommended settings for the power plant.

In another example, it is possible that none of the selected adaptive constraint values satisfy the solution (e.g., the objective function is indeed not solvable even if multiple constraints associated with corresponding flexible manipulated variables are relaxed). In this case, the constraints associated with tight manipulated variables may also be relaxed based on priority (least priority relaxed first) or as determined through simulation to find conditions that provide an solution. This solution, though a sub-optimal solution (not resulting from the desired constraints), is selected to satisfy the objective function.

In yet another embodiment, the constraint analysis module 38 is activated because it is not clear if the solution obtained with the current constraints is the best solution. In this scenario, the analysis module considers the existing constraint values (defined within the acceptable values of constraints), the tight manipulated variables and the flexible manipulated variables to find a new solution. It may be noted that such activation may be carried out periodically and to determine if indeed the solution practiced is the best solution (e.g., such events happen in pre-programmed manner after every finite cycles). Alternatively, such an event may also be user triggered.

The adaptive constraint evaluation module 40 selects the associated constraints both for tight and flexible manipulated variables for adapting their values such that the tight manipulated variables are not impacted, or they are further tightened to improve the solution. Thus, instead of only relaxing the constraints, some constraints are tightened and some others are relaxed. This ensures, a solution is obtained and that the solution is also the best among the possible solutions (e.g., more stable and profitable solution over long term).

In a case where the values of the adaptive constraints are determined through simulation, the adaptive constraint values may be selected as the acceptable values of constraints as initial conditions and the new adaptive constraint values are arrived at algorithmically, where some of the adaptive constraints values are for the tight manipulated variable and the values are such that they help operate the plant with as tight a value as possible for the tight manipulated variable. Such an operation may be advantageous when, for example, the functions resulting from the tight manipulated variable influences multiple aspects/functions of the plant, and having tighter control over the tight manipulated variable helps provide better control over all the related aspects/functions of the plant.

The constraint analysis module 38 thus finds the optimal solution of the objective function i.e. the optimal load scheduling solution that is sent to the control system for further action by the control system to deliver set-points through process controllers for operating parameters of different equipments in the power plant.

In another embodiment, the constraint analysis module 38 may include additional modules, such as a decision module 40 to analyze the impact of using the adaptive constraint values on the power plant operation in short term and long term. The term short-term effect as used herein indicates the immediate effect of new values (recommended adaptive values of constraints to be used in the optimization problem). It will be appreciated by those skilled in the art that when the power plant is being operated by the solution obtained by changing at least one of the constraints from its first values (e.g., using the adaptive constraint values), there shall be an effect in the overall operation of the power plant different from the first values and impacting the power plant differently from the impact of the first values. This impact is associated with the term 'long term effect'.

In long term, it is not desirable that the operation of a power plant should be undesirably deviated from its expected trajectory and since the long term effect is an outcome of a condition different from the initial or desired conditions expressed with the objective function with the initial or desired constraints, the decision module compares the impact of adaptive constraints in long term to help decision making.

In an exemplary embodiment, the objective function is modified to include a compensation term to compensate for the effect on power plant operation in long term by using the adaptive constraints. The compensation term is calculated by the adaptive penalty module 42 over the long term (long term is a prediction horizon or the time period for which the power plant model, forecast modules and data such as demand forecast can reliably be used to forecast plant trajectory). The modified objective function that includes the compensation term is checked to ascertain if the use of adaptive constraint values brought any significant benefit in the power plant operation as shown in equations 17 and 18 given below in the Example section. The benefit may also be ascertained with respect to other alternative solutions in any time span within the prediction horizon.

In another exemplary embodiment, the decision module 40 may seek user intervention or use configured significance values to determine if the optimizer should continue with the modification as done using the adaptive constraints based on the benefit over long term.

In another exemplary embodiment, the decision module may be used to compare the new solution (e.g., value of the objective function with the adaptive constraints) with that obtained prior to applying the adaptive constraints, and observe the effect of both of these in short or long term. The selection is then based on the values that are beneficial to the plant (without too many side effects expressed as a compensation term wherein the side effects are less significant than the benefit from the new solution resulting from adapted constraints).

An example illustrating some aspects of the exemplary method described herein is presented below for clearer understanding.

Example

Referring to FIG. 1, electric generators G1, G2 and G3 are said to be operated nominally (e.g., exemplary value) for 45 MW production and have the maximum capacity of 50 MW power. Here, nominal capacity is used as an upper bound for the generator capacity constraint (desired constraint) in the optimization problem. In situations where the demand requirement is high, keeping the nominal capacity as the upper bound may lead to "No solution" or solution with high penalty for not meeting the demand. For such situations, values of the constraints are adapted to have the upper bound between nominal and maximum values in order to find the optimal solution. The method of adapting the constraints is discussed in the following section.

The value of the cost function, with the current constraints value (e.g., with an upper bound on all generators as 45 MW), is obtained from the optimization solver module of FIG. 2. This cost function is used in the adaptive constraint evaluation module of the constraint analysis module (FIG. 3) to find the dominant cost terms in equation 1 and dominant variables which contribute to the cost function. The dominant variables are identified using a statistical analysis tool such as Principal Component Analysis (PCA). For example, consider the case where all the generators G1, G2 and G3 have the nominal capacity of 45 MW. Assume that G1 has the lowest operating cost of all the three and G2 has lower operating cost than G3. From the Forecast Model, if the power demand is less than 135 MW, then the optimizer will choose to run all the three generators less than or equal to its nominal value of 45 MW to meet the power demand. But if the power demand is 140 MW, then some of the generators capacity has to be relaxed and operate up to its maximum capacity of 50 MW to meet the power demand. The adaptive constraint evaluation module makes use of the power plant model (like a relation between depreciation cost and load as given in Eqn. 8) together with a PCA technique to decide upon which generator capacity constraint has to be relaxed to the maximum value of 50 MW in order to meet the demand constraint. This analysis, for example, identifies the cost terms $C_{dem}$, and $C_{st,life}$ as the dominant cost terms in the cost function given in equation 1. Also the analysis can identify the capacity of generators G1 and G2 as the dominant variable and its upper bound capacity constraint value may be advantageous to be relaxed up to 50 MW. The Monte-Carlo simulation may be used to identify the new constraints values corresponding to the dominant variables (also in consideration with statistical confidence limits) that gives least cost function value.

For the example, changing the upper bound of the capacity constraint in equation 10 for the generators G1 and G2 between 45 MW and 50 MW may lead to a decrease in efficiency of the generator. The simulation results may be used in deciding the optimal value between 45 and 50 MW which gives a least cost function value and also considering the EOH (Equivalent Operating Hour) value of the generator. The upper bound of the capacity constraint $\gamma_{i,max}$ as given in equation 10 is changed based on the analysis results. The short term cost function value ($J_{ST}$) based on the adapted constraints is calculated using equation 1 with an adapted constraint value in the equation 10 which may not consider the consequence of using the new adapted constraint values, and it may be desirable to use the objective function that considers the long term effect for such purposes.

Adaptive Penalty module makes use of the demand forecast and power plant model to calculate the penalty value of adapting the constraint value on the long term. This penalty value is used as additive term to short term cost function to calculate the long term cost function value ($J_{LT}$) as given by eqn. 17. For the example considered, $J_{LT}$ is given by eqn. 18.

$$J_{LT}=J_{ST}+\text{Penalty} \tag{17}$$

$$J_{LT}=J_{ST}+C_{life} \tag{18}$$

where, $C_{life}$ is the depreciation cost calculated from equation 8, on operating the generators G1 and G2 with the adapted value of capacity constraint over long time horizon. The suitability of short term cost function or that of long term cost function is based on the conditions (e.g. demand forecast and use of relaxed constraints) of the plant. Therefore, this is better judged based on the significance values preconfigured or user intervention facilitated by Decision Module. The new adapted constraint value may only be used in the optimization solution if the benefit from lowering the penalty from not meeting the demand by operating the generators above its nominal value is significant compared with the penalty associated with depreciation of the generators.

While only certain features of the invention have been illustrated and described herein, many modifications and changes will occur to those skilled in the art. It is, therefore, to be understood that the appended claims are intended to cover all such modifications and changes as fall within the true spirit of the invention.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

We claim:

1. A method for operating one or more power generation units of a power plant with a control system that comprises an optimizer to obtain an optimal solution for optimizing load scheduling for the one or more power generation units by controlling process parameters of the power plant based on the optimal solution, the method comprising:
    detecting an event indicative of a need for adapting one or more constraints of an objective function used in load scheduling, wherein the event includes a condition of nonconvergence of a solution with the one or more constraints of the objective function, wherein the objective function is formulated with terms, each of the terms being a function of one or more manipulated variables of the power plant, and wherein the one or more constraints relate to the one or more manipulated variables;
    selecting one or more constraints to be adapted by analyzing the objective function and a power plant model to determine which of the one or more manipulated variables are to be relaxed through its constraints for optimization, on detection of the event indicative of the need for adapting one or more constraints;
    determining adaptive constraint values for the selected one or more constraints by using the power plant model and altering the value of the selected one or more constraints for solving the objective function;
    analyzing an impact of using the adaptive constraint values on the power plant operation in a short term and in a long term, wherein the impact in the short term is an immediate effect on operating the power plant with the adaptive constraint values, and wherein the long term is a time period for which a demand forecast and the power plant model forecast plan trajectory;
    comparing a value of the objective function with the adaptive constraint values in the short term and in the long term with a value of the objective function obtained prior to applying the adaptive constraint values;
    selecting the adaptive constraint values for operating the one or more power generation units of the power plant based on the comparison;
    solving the objective function with the selected adaptive constraint values to obtain a solution of the objective function; and
    sending commands to actuators in the power plant to control process parameters of the power plant based on the solution of the objective function to operate the one or more power generation units of the power plant.

2. The method of claim 1 wherein
    determining adaptive constraint values for the selected one or more constraints is based on one of:
        preconfiguring a selection of adaptive constraint values based on pre-assigned priorities, and
        estimating the adaptive constraint values using Monte-Carlo simulation.

3. The method of claim 1, wherein selecting constraints to be adapted further comprises determining the one or more manipulated variables as at least one of a flexible manipulated variable and a tight manipulated variable, wherein the flexible manipulated variable is the manipulated variable that can be relaxed by adapting the constraints associated with the flexible manipulated variable and the tight manipulated variable is the manipulated variable that can be tightened by adapting the constraints associated with the tight manipulated variable.

4. The method of claim 1, wherein selecting one or more constraints to be adapted further comprises:
    selecting one or more constraints to at least one of relax and tighten based on a determination of the one or more manipulated variables as flexible manipulated variables and tight manipulated variables.

5. The method of claim 1, wherein analyzing an impact of use of the adaptive constraint values further comprises use of the adaptive constraint values in the solution of the objective function when a benefit from lowering a penalty from not meeting a power demand by operating the one or more power generation units at above nominal values is greater than a penalty associated with depreciation cost of the one or more power generation units over the time period used to forecast a power plant trajectory, wherein the objective function includes terms relating to penalty and depreciation cost.

6. The method of claim 1, wherein the value of the objective function represents a cost that is to be minimized.

* * * * *